E. F. SIPHER.
RECTIFIER ANODE.
APPLICATION FILED JUNE 9, 1914.
1,170,689.
Patented Feb. 8, 1916.
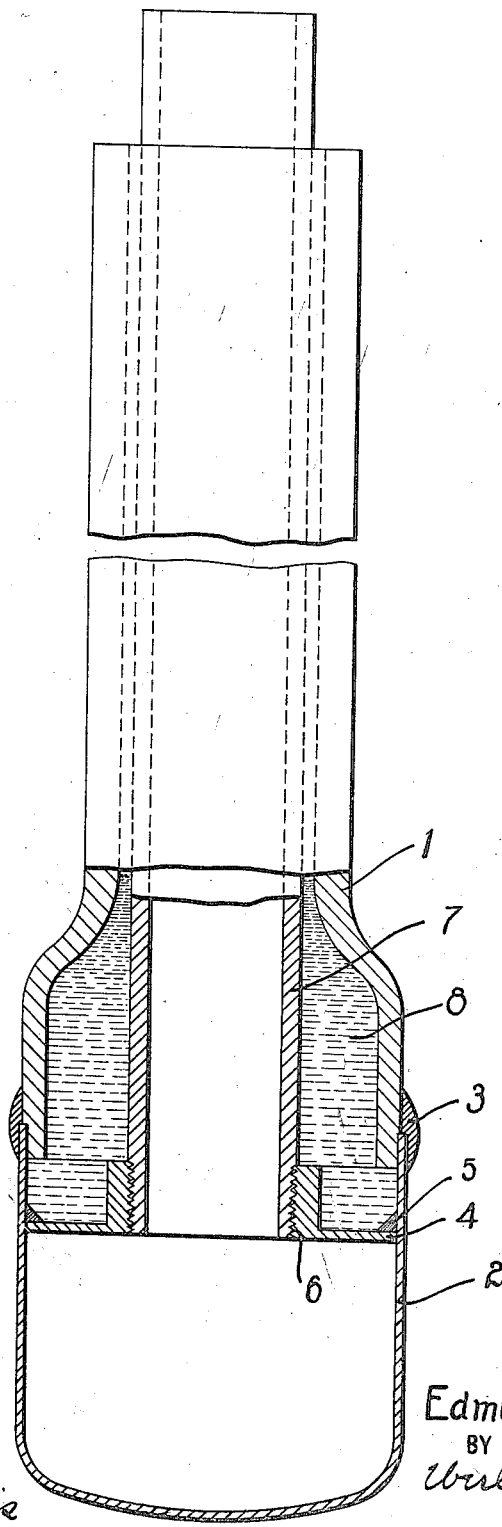
WITNESSES:
INVENTOR
Edmund F. Sipher.
BY
ATTORNEY

UNITED STATES PATENT OFFICE.

EDMUND F. SIPHER, OF WILKINSBURG, PENNSYLVANIA, ASSIGNOR TO WESTINGHOUSE ELECTRIC AND MANUFACTURING COMPANY, A CORPORATION OF PENNSYLVANIA.

RECTIFIER-ANODE.

1,170,689.

Specification of Letters Patent.

Patented Feb. 8, 1916.

Application filed June 9, 1914. Serial No. 844,107.

*To all whom it may concern:*

Be it known that I, EDMUND F. SIPHER, a citizen of the United States, and a resident of Wilkinsburg, in the county of Allegheny and State of Pennsylvania, have invented a new and useful Improvement in Rectifier-Anodes, of which the following is a specification.

My invention relates to hollow electrodes for vacuum electric apparatus and it has for its object to provide an electrode of the character specified that shall be cheap and rugged in construction, capable of readily transmitting heat to cooling fluid contained therein, and capable of maintaining a high vacuum.

The single figure of the accompanying drawing is a view, partially in section and partially in elevation, of an anode embodying my invention.

In the operation of vapor rectifiers and like apparatus, it is essential that the temperature of the anodes be maintained within reasonably low limits in order that the negative electrode reluctance thereof shall be maintained at a high figure and short circuiting prevented. The customary method employed for controlling the anode temperature is to pass water or other suitable cooling fluid through the interior thereof. This necessitates the construction of a hollow electrode that shall be absolutely vacuum tight, in order that the vacuum of the container shall not be impaired, and that shall also have relatively thin walls in order that there may be a rapid transfer of heat to the cooling fluid. By my invention, I attain these results in a simple and effective manner.

Referring to the drawing, the shank 1 of my electrode is composed of a tube of steel or other suitable metal having comparatively thick walls in order to have mechanical strength. A cap 2 of relatively thin material, such, for example, as sheet steel, is welded to the end of the tube 1 as shown at 3. I have found that it is extremely difficult to provide a weld at the point 3 that will be absolutely gas tight and, accordingly, I attach a flange member 4 to the inner surface of the cap 2 by any suitable means, such as welding, shown at 5. The inner surface of the flange 4 is threaded, as shown at 6, and a tube 7, for conveying cooling fluid to the interior of the cap 2, engages the threaded portion. The annular space between the tube 7 and the tube 1 is filled with mercury, as shown at 8, in order to seal the joint 3.

By this structure, I obtain an electrode of great mechanical strength, good heat-radiating properties and absolutely gas-tight construction, under all conditions.

I claim as my invention:

1. A hollow electrode for vacuum electric apparatus comprising a hollow stem having comparatively thick walls and a head attached thereto having comparatively thin walls.

2. A hollow electrode for vacuum electric apparatus comprising a hollow stem having thick walls and a head having thin walls welded thereto.

3. A hollow electrode for vacuum electric apparatus comprising a hollow stem, a head united thereto, and a liquid seal covering the line of union.

4. A hollow electrode for vacuum electric apparatus comprising a hollow stem, a head united thereto, and a liquid seal within the anode and covering the line of union.

5. An anode for vacuum electric apparatus comprising a hollow stem, a hollow head united thereto, an internal flange on the head, a tube attached thereto and projecting outwardly through the stem, and a pool of sealing fluid in the annular space between said tube and the stem.

In testimony whereof, I have hereunto subscribed my name this 29th day of May 1914.

EDMUND F. SIPHER.

Witnesses:
D. H. ROSE,
B. B. HINES.